US010833366B2

(12) United States Patent
Coleman et al.

(10) Patent No.: US 10,833,366 B2
(45) Date of Patent: Nov. 10, 2020

(54) LITHIUM TITANATE CELL

(71) Applicant: Altairnano, Inc., Reno, NV (US)

(72) Inventors: Mike Coleman, Reno, NV (US); Veselin Manev, Reno, NV (US)

(73) Assignee: Altairnano, Inc., Reno, NV (US)

( * ) Notice: Subject to any disclaimer, the term of this patent is extended or adjusted under 35 U.S.C. 154(b) by 197 days.

(21) Appl. No.: 14/398,682

(22) PCT Filed: Apr. 30, 2013

(86) PCT No.: PCT/US2013/038951
§ 371 (c)(1),
(2) Date: Nov. 3, 2014

(87) PCT Pub. No.: WO2013/166074
PCT Pub. Date: Nov. 7, 2013

(65) Prior Publication Data
US 2016/0043436 A1 Feb. 11, 2016

Related U.S. Application Data

(60) Provisional application No. 61/687,842, filed on May 1, 2012.

(51) Int. Cl.
| | | |
|---|---|---|
| H01M 10/0567 | (2010.01) | |
| H01M 10/0568 | (2010.01) | |
| H01M 10/0569 | (2010.01) | |
| H01M 4/485 | (2010.01) | |
| H01M 10/0525 | (2010.01) | |
| H01M 4/58 | (2010.01) | |
| H01M 4/02 | (2006.01) | |

(52) U.S. Cl.
CPC ....... H01M 10/0568 (2013.01); H01M 4/485 (2013.01); H01M 10/0525 (2013.01); H01M 10/0567 (2013.01); H01M 10/0569 (2013.01); H01M 4/5825 (2013.01); H01M 2004/027 (2013.01); H01M 2300/0037 (2013.01)

(58) Field of Classification Search
CPC ............. H01M 10/0569; H01M 4/485; H01M 10/0567; H01M 10/0525; H01M 10/0568; H01M 4/5825; H01M 2300/0037; H01M 2004/027
See application file for complete search history.

(56) References Cited

U.S. PATENT DOCUMENTS

| | | | |
|---|---|---|---|
| 5,437,945 A * | 8/1995 | Omaru | H01M 4/587 429/223 |
| 5,993,997 A * | 11/1999 | Fujimoto | H01M 4/131 423/448 |
| 6,087,044 A * | 7/2000 | Iwase | H01M 4/133 429/213 |
| 2001/0046629 A1 * | 11/2001 | Inagaki | H01M 4/134 429/231.9 |
| 2003/0129498 A1 * | 7/2003 | Tsukamoto | H01M 6/5088 429/324 |
| 2004/0013946 A1 * | 1/2004 | Abe | H01M 6/168 429/326 |
| 2006/0019164 A1 | 1/2006 | Bonhomme et al. | |
| 2006/0147808 A1 * | 7/2006 | Xiao | H01M 10/0525 429/326 |
| 2007/0009798 A1 * | 1/2007 | Inagaki | C01G 23/005 429/231.1 |
| 2007/0092802 A1 * | 4/2007 | Ahn | H01M 10/052 429/326 |
| 2008/0318136 A1 * | 12/2008 | Amine | H01G 9/022 429/341 |
| 2009/0246630 A1 * | 10/2009 | Sakitani | H01M 4/60 429/212 |
| 2011/0136006 A1 * | 6/2011 | Nogi | H01M 6/162 429/200 |
| 2011/0195308 A1 * | 8/2011 | Lee | H01M 4/131 429/213 |
| 2011/0207000 A1 * | 8/2011 | Jow | H01M 4/133 429/343 |
| 2011/0236299 A1 * | 9/2011 | Gao | H01M 4/131 423/598 |
| 2012/0172613 A1 * | 7/2012 | Wagner | C07F 9/091 558/101 |
| 2012/0270092 A1 * | 10/2012 | Honbou | H01M 10/4235 429/156 |
| 2012/0308890 A1 * | 12/2012 | Okuda | H01M 4/131 429/218.2 |
| 2013/0040209 A1 * | 2/2013 | Mio | H01M 10/0567 429/336 |

FOREIGN PATENT DOCUMENTS

WO 2011043934 A1 4/2011

OTHER PUBLICATIONS

International Application No. PCT/US2013/038951, International Search Report dated Aug. 23, 2013.

* cited by examiner

*Primary Examiner* — Muhammad S Siddiquee
(74) *Attorney, Agent, or Firm* — Yudell Isidore PLLC

(57) ABSTRACT

The embodiment relates to the field of electrolyte selection in lithium ion cells which may employ $Li_4Ti_5O_{12}$ compounds as negative electrode material and $LiPF_6$ as the ionic salt component in the cell electrolyte solution. The embodiment further relates to improvements in lithium ion cell performance as a result of selection of specific formulation of electrolyte for lithium ion cells.

14 Claims, 5 Drawing Sheets

LITHIUM TITANATE CELL

PRIORITY

The present application is a national stage of International Application No. PCT/US2013/038951, titled "Improved Lithium Titanate Cell," filed Apr. 30, 2013 and claims priority to U.S. Provisional Patent Application No. 61/687,842, filed May 1, 2012. The disclosure of International Application No. PCT/US2013/038951 is hereby incorporated herein by reference in its entirety for all purposes.

FIELD OF THE INVENTION

The embodiment relates to the field of electrolyte selection in lithium ion cells which may employ $Li_4Ti_5O_{12}$ compounds as negative electrode material and $LiPF_6$ as the ionic salt component in the cell electrolyte solution. The invention further relates to improvements in lithium ion cell performance as a result of the selection of specific formulations of electrolytes for lithium ion cells.

BACKGROUND OF THE INVENTION

In lithium ion cell design, increasing the overall charge and discharge rate capability of cells is a desirable objective. Rate capability is a basic cell performance parameter that impacts many other measurable cell performance parameters such as charge and discharge rates, cell capacity, capacity retention, cell discharge voltage and cell thermal performance upon cycling. While the contribution to the overall rate capability comes from various lithium ions transport related factors such as lithium ion electrode interface kinetics, bulk electrode lithium ion kinetics, lithium ion transference number etc., one of the key impedance factors is governed by the conductivity of the electrolyte. Electrochemical cell design often selects electrolyte compositions such that the transport of lithium ions through the electrolyte is maximized. As a practical matter designers often attempt to maximize the ionic conductivity of the electrolyte through selection of salt concentrations.

In lithium ion cell design, the ionic salt concentration can be varied. Increasing the salt concentration improves the conductivity of the electrolyte proportionately up to a point beyond which the conductivity does not increase proportionately as a result of ion-pairing. Solution viscosity also increases with increasing salt concentration which reduces the effective mobility of the ions and hence the conductivity of the electrolyte. These opposing effects produce a conductivity maximum at a specific concentration of salt in the electrolyte. After the conductivity maximum is reached, any further increase in salt concentration results in higher ion aggregation and higher viscosity of the solution, which reduces both the free-ion number and the ionic mobility simultaneously, Xu, "Non-aqueous Liquid Electrolytes for Lithium-Based Rechargeable Batteries Review" (*Chem. Rev.* 2004, 104, 4303-4417).

A widely used and studied electrolyte composition for Li ion batteries is $LiPF_6$ salt dissolved in mixture of ethylene carbonate (EC) and ethylmethyl carbonate (EMC). The maximum ionic conductivity of this electrolyte at ambient temperatures is at about 1 M $LiPF_6$, Ding et al. (*Journal of The Electrochemical Society* (2001), 148 A1196-A1204. In order to minimize impedance and maximized the rate capability and hence improve the overall performance of the cell, one alternative is to maximize the conductivity of the electrolyte.

For lithium ion cells, studies of $LiPF_6$ concentrations of 0.5 M-3.6 M have been conducted using cells with carbon as the negative electrode. The studies indicate no benefit in using higher concentrations of salt. Currently, various designs of commercial cells utilize about 1.0 M $LiPF_6$ concentrations in the electrolyte, as the conductivity maximum around this concentration has been established. Most studies in the industry advocate the use of about 1.0 to 1.2 M concentration of LiPF6 salt in a cell.

There is a need to increase cell capacity, increase cell rate capability, improve capacity retention, increase cell charge and discharge voltages by optimizing electrolyte compositions for cells with lithium titanate as a negative electrode.

DETAILED DESCRIPTION OF THE PREFERRED EMBODIMENTS

Figure 1:
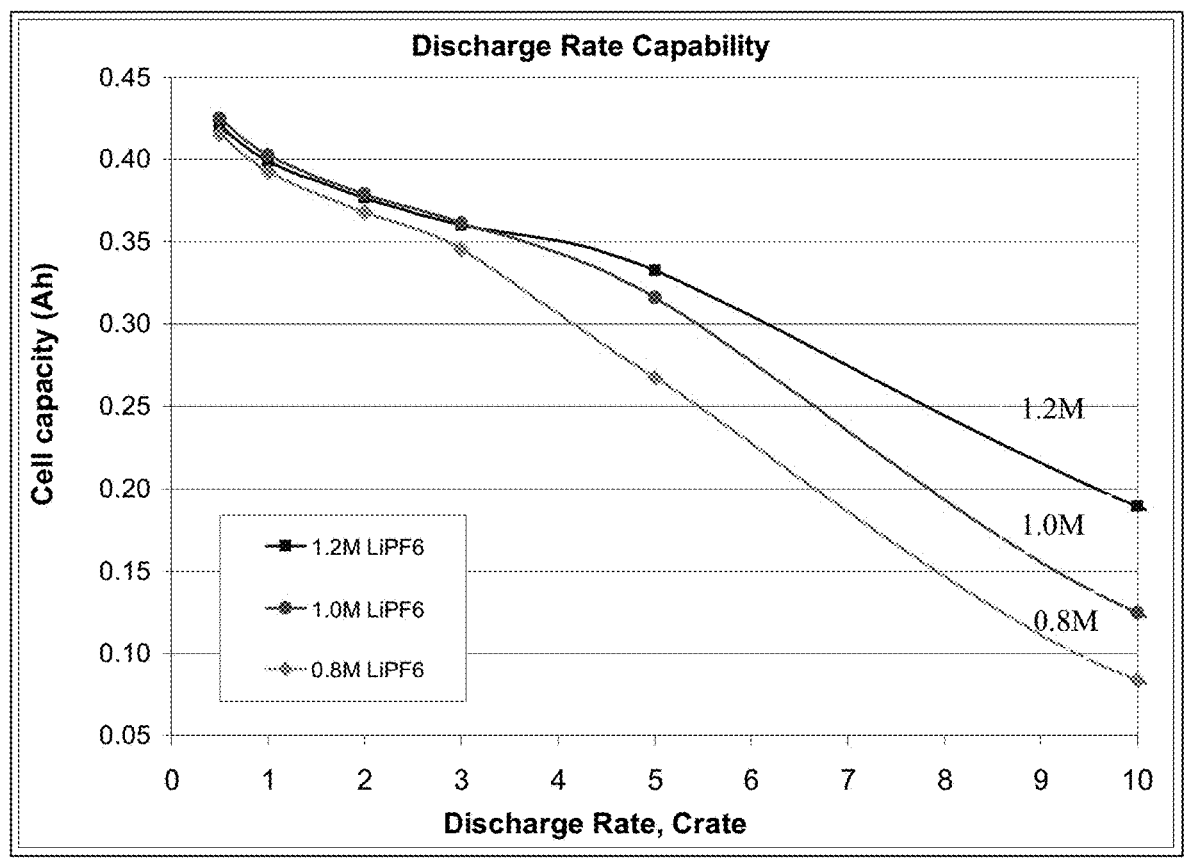
FIG. 1 is an illustration of the cell capacity vs. discharge C rate for EC:EMC ratio of 1:3. where $LiPF_6$ salt concentration is respectively 0.8 M, 1.0 M and 1.2 M.

The embodiment relates to methods and compositions of lithium ion batteries whereby the electrolyte comprises at least one cyclic ester and at least one linear ester and a lithium salt wherein the lithium salt concentration exceeds the lithium salt concentration corresponding to maximum electrolyte ionic conductivity.

The embodiment relates to methods and compositions which maximize cell capacity by composing electrolytes with at least one cyclic ester and at least one linear ester and a lithium salt wherein the lithium salt concentration exceeds the lithium salt concentration corresponding to maximum electrolyte ionic conductivity.

The embodiment relates to methods and compositions which improve cell rate capability by composing electrolytes with at least one cyclic ester and at least one linear ester and a lithium salt wherein the lithium salt concentration exceeds the lithium salt concentration corresponding to maximum electrolyte ionic conductivity.

The embodiment relates to methods and compositions which improve capacity retention by composing electrolytes with at least one cyclic ester and at least one linear ester and a lithium salt wherein the lithium salt concentration exceeds the lithium salt concentration corresponding to maximum electrolyte ionic conductivity.

The embodiment relates to methods and compositions which increase cell charge and discharge voltage by composing electrolytes with at least one cyclic ester and at least one linear ester and a lithium salt wherein the lithium salt concentration exceeds the lithium salt concentration corresponding to maximum electrolyte ionic conductivity.

The embodiment relates to lithium ion cells comprising at least $Li_4Ti_5O_{12}$ compound as a negative electrode and at least one lithiated transition metal oxide or lithiated transition metal phosphate as positive electrode, a separator and a non-aqueous electrolyte including $LiPF_6$ salt dissolved in a mixture of organic carbonate cyclic esters and organic carbonate linear esters wherein the ethylene carbonate is at least 50% of the total amount of cyclic esters and ethyl methyl carbonate is at least 50% of the total amount of organic carbonate linear esters and the concentration of the said $LiPF_6$ salt is equal or higher than 1.4 M.

The embodiment relates to methods and compositions of lithium ion batteries whereby the electrolyte comprises at least one cyclic ester and at least one linear ester and one or more lithium salt(s) wherein the lithium salt concentration exceeds the lithium salt concentration corresponding to maximum electrolyte ionic conductivity. Increasing the concentration of the lithium salt in the electrolyte beyond the optimal salt concentration leads to an increase in cell capacity, improvement in capacity retention, increase the cell rate capability and increase in cell mean and discharge voltages.

The embodiment relates to methods and compositions of lithium ion batteries whereby the electrolyte comprises at least one cyclic ester and at least one linear ester and one or more lithium salt(s) wherein the lithium salt concentration exceeds the lithium salt concentration corresponding to maximum electrolyte ionic conductivity. The lithium ion batteries have at least a $Li_4Ti_5O_{12}$ compound as an active negative electrode material, at least one lithiated transition metal oxide or transition metal phosphate as a positive electrode active material.

The present embodiment relates to lithium ion cells having at least a $Li_4Ti_5O_{12}$ compound as an active negative electrode material, at least one lithiated transition metal oxide or transition metal phosphate as a positive electrode active material and an electrolyte composition having at least one cyclic ester and at least one linear ester as electrolyte solvents and $LiPF_6$ compound as the main electrolyte salt, where the concentration of the $LiPF_6$ salt is selected to be greater than the concentration corresponding to maximum electrolyte ionic conductivity. A preferred cyclic ester is ethylene carbonate (EC) and a preferred linear ester according to the present embodiment is ethylmethyl carbonate (EMC).

Examples of solvents which may be used in the methods and compositions of the present embodiment include ethylene carbonate (EC), ethylene methyl carbonate (EMC), propylene carbonate (PC), butylene carbonate (BC), vinylene carbonate (VC), diethylene carbonate (DEC), dimethylene carbonate (DMC), γ-butyrolactone, sulfolane, methyl acetate (MA), methyl propionate (MP), Methyl Butyrate (MB) and methylformate (MF).

As previously cited, the range of 1.0-1.2 M $LiPF_6$ salt is the industry standard for maximum conductance in the cell electrolyte. Surprisingly, however, a higher concentration of the lithium salt (e.g. $LiPF_6$ salt) in the electrolyte solution results in a better cell rate capability than cells activated with electrolyte with $LiPF_6$ salt concentration corresponding to its maximum ionic conductivity of about 1 M. The concentration of lithium salts in the electrolytes of the present embodiment can be, 1.3 M, 1.4 M, 1.5 M, 1.6 M, 1.7 M, 1.8 M, 1.9 M, 2.0 M, 2.1 M, 2.2 M, 2.3 M, 2.4 M or 2.5 M. Moreover, the concentration of lithium salts in the electrolytes of the present embodiment can be between 1.2 M-2.5 M, 1.2 M-2.4 M, 1.2 M-2.3 M, 1.2 M-2.2 M, 1.2 M-2.1 M, 1.2 M-2.0 M, 1.2 M-1.9 M, 1.2 M-1.8,1.2 M-1.7,1.2 M-1.6 M, 1.2 M-1.5 M, 1.2 M-1.4 M, 1.2 M-1.3 M, 1.3 M-2.5 M, 1.3 M-2.4 M, 1.3 M-2.3 M, 1.3 M-2.2 M, 1.3 M-2.1 M, 1.3 M-2.0 M, 1.3 M-1.9 M, 1.3 M-1.8 M, 1.3 M-1.7 M, 1.3 M-1.6 M, 1.3 M-1.5 M, 1.3 M-1.4 M, 1.4 M-2.5 M, 1.4 M-2.4 M, 1.4 M-2.3 M, 1.4 M-2.2 M, 1.4 M-2.1 M, 1.4 M-2.0 M, 1.4 M-1.9 M, 1.4 M-1.8 M, 1.4 M-1.7 M, 1.4 M-1.6 M, 1.4 M-1.5 M, 1.5 M-2.5 M, 1.5 M-2.4 M, 1.5 M-2.3 M, 1.5 M-2.2 M, 1.5 M-2.1 M, 1.5 M-2.0 M, 1.5 M-1.9 M, 1.5 M-1.8,1.5 M-1.7,1.5 M-1.6 M, 1.6 M-2.5 M, 1.6 M-2.4 M, 1.6 M-2.3 M, 1.6 M-2.2 M, 1.6 M-2.1 M, 1.6 M-2.0 M, 1.6 M-1.9 M, 1.6 M-1.8 M, 1.6 M-1.7 M, 1.7 M-2.5 M, 1.7 M-2.4 M, 1.7 M-2.3 M, 1.7 M-2.2 M, 1.7 M-2.1 M, 1.7 M-2.0 M, 1.7 M-1.9 M, 1.7 M-1.8 M. Examples of lithium salts include $LiBF_4$, $LiPF_6$, $LiAsF_6$, $LiClO_4$, $LiSbF_6$, $LiCF_3SO_3$, and $LiN(CF_3SO_2)_2$.

Figure 2:
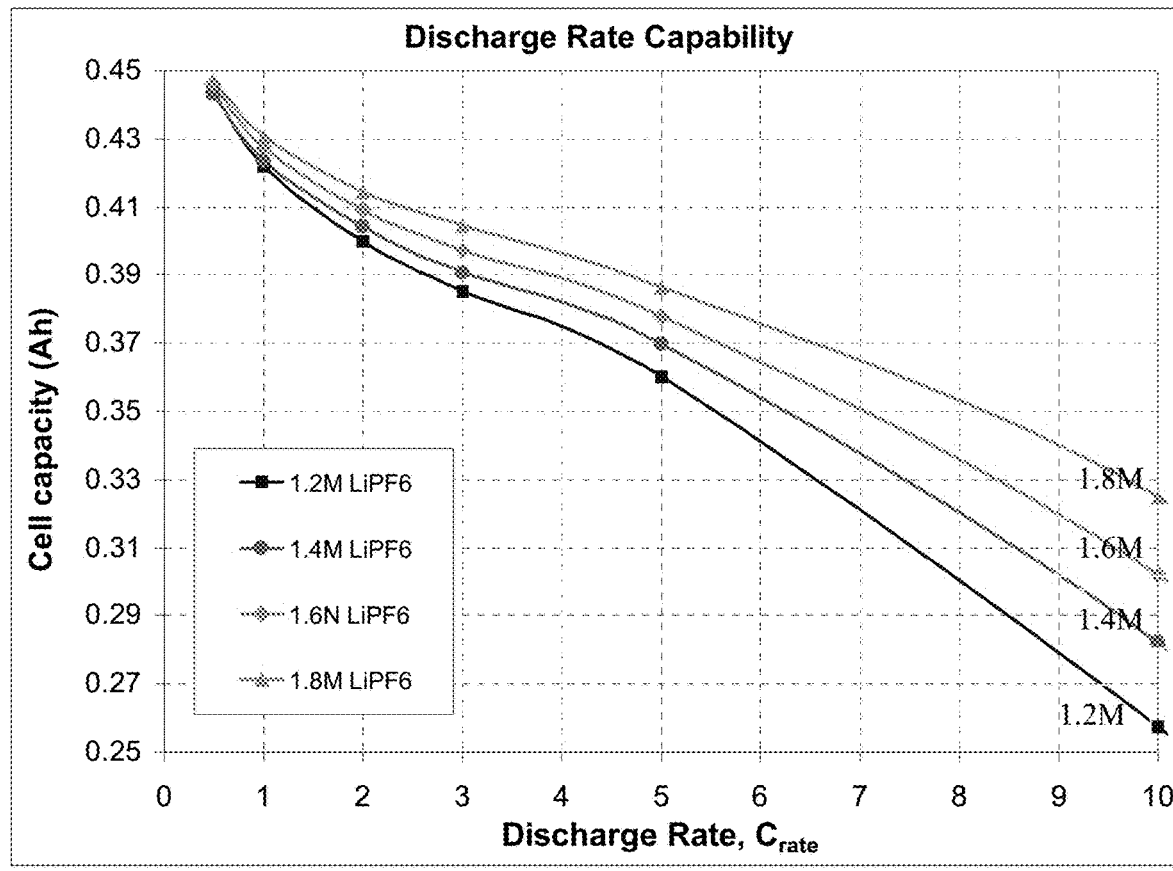
FIG. 2 is an illustration of the cell capacity vs. discharge C rate for EC:EMC ratio of 1:4, where $LiPF_6$ salt concentration is respectively 1.2 M, 1.4 M, 1.6 M and 1.8 M.

The discharge rate capability increases with an increase in lithium salt concentration (FIGS. 1 and 2). The increase in discharge rate capability may be 5% or greater, 10% or greater, 5% or greater, 15% or greater, 20% or greater, 25% or greater, 30% or greater, 35% or greater, 40% or greater, 45% or greater, 50% or greater, 55% or greater, 60% or greater, 75% or greater, 80% or greater, 85% or greater, 90% or greater, 95% or greater, 100% or greater or 200% or greater. The increase may be from 5% to 100%, 5% to 90%, 5% to 85%, 5% to 80%, 5% to 75%, 5% to 70%, 5% to 65%, 5% to 60%, 5% to 55%, 5% to 50%, 5% to 45%, 5% to 40%, 5% to 35%, 5% to 30%, 5% to 25%, 5% to 20%, 5% to 15%, 5% to 10%, 10% to 100%, 10% to 90%, 10% to 85%, 10% to 80%, 10% to 75%, 10% to 70%, 10% to 65%, 10% to 60%, 10% to 55%, 10% to 50%, 10% to 45%, 10% to 40%, 10% to 35%, 10% to 30%, 10% to 25%, 10% to 20%, 10% to 15%, 25% to 100%, 25% to 90%, 25% to 80%, 25% to 70%, 25% to 60%, 25% to 50%, 25% to 40%, 25% to 35%.

Figure 3:
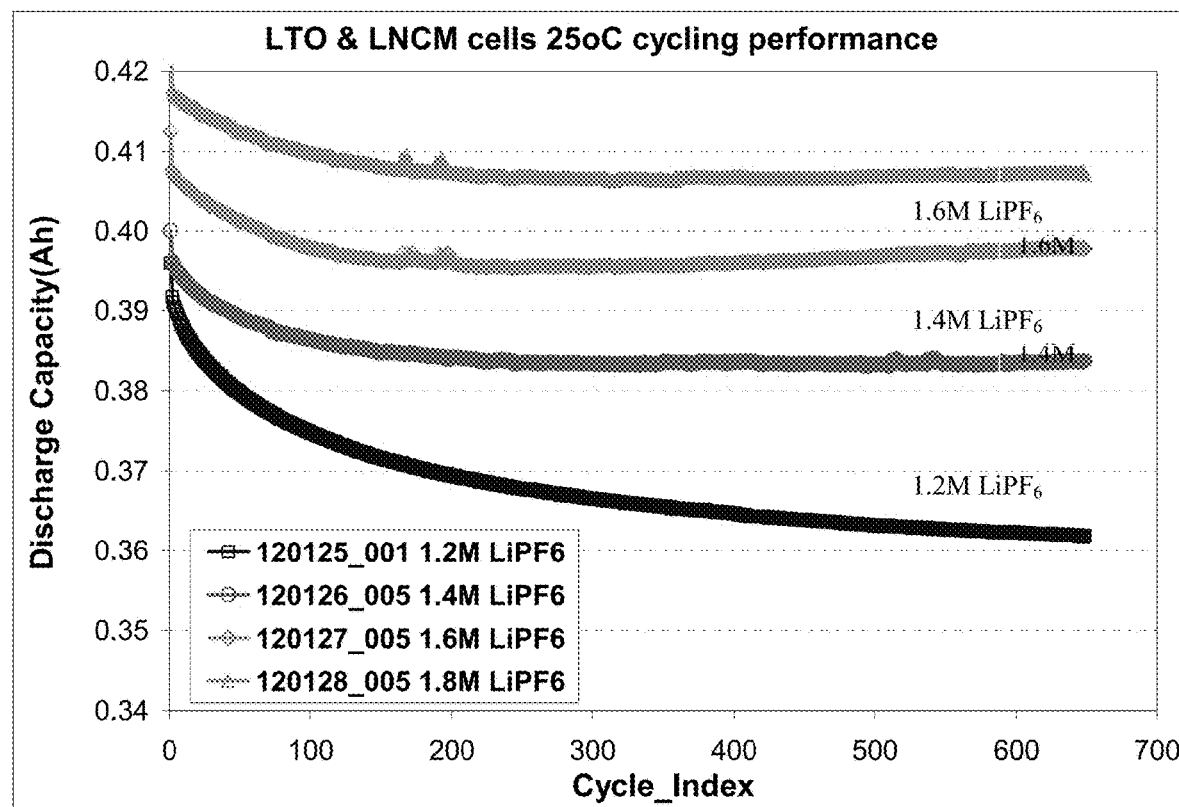
FIG. 3 is an illustration of the capacity and capacity retention during 25° C. cycling test of $Li_4Ti_5O_{12}$/$LiNi_{0.33}Co_{0.33}Mn_{0.33}O_2$ cell activated with $LiPF_6$ in EC:EMC=1:4 electrolyte, where $LiPF_6$ salt concentration is respectively 1.2 M, 1.4 M, 1.6 M and 1.8 M.

Increasing the lithium salt (e.g. $LiPF_6$ salt) concentration to a concentration greater than the electrolyte concentration corresponding to the maximum ion conductivity results in an increase in cell capacity and capacity retention (FIG. 3). The increase in cell capacity and/or cell capacity retention may be 5% or greater, 10% or greater, 5% or greater, 15% or greater, 20% or greater, 25% or greater, 30% or greater, 35% or greater, 40% or greater, 45% or greater, 50% or greater, 55% or greater, 60% or greater, 75% or greater, 80% or greater, 85% or greater, 90% or greater, 95% or greater, 100% or greater or 200% or greater. The increase may be from 5% to 100%, 5% to 90%, 5% to 85%, 5% to 80%, 5% to 75%, 5% to 70%, 5% to 65%, 5% to 60%, 5% to 55%, 5% to 50%, 5% to 45%, 5% to 40%, 5% to 35%, 5% to 30%, 5% to 25%, 5% to 20%, 5% to 15%, 5% to 10%, 10% to 100%, 10% to 90%, 10% to 85%, 10% to 80%, 10% to 75%, 10% to 70%, 10% to 65%, 10% to 60%, 10% to 55%, 10% to 50%, 10% to 45%, 10% to 40%, 10% to 35%, 10% to 30%, 10% to 25%, 10% to 20%, 10% to 15%, 25% to 100%, 25% to 90%, 25% to 80%, 25% to 70%, 25% to 60%, 25% to 50%, 25% to 40%, 25% to 35%.

Figure 4:
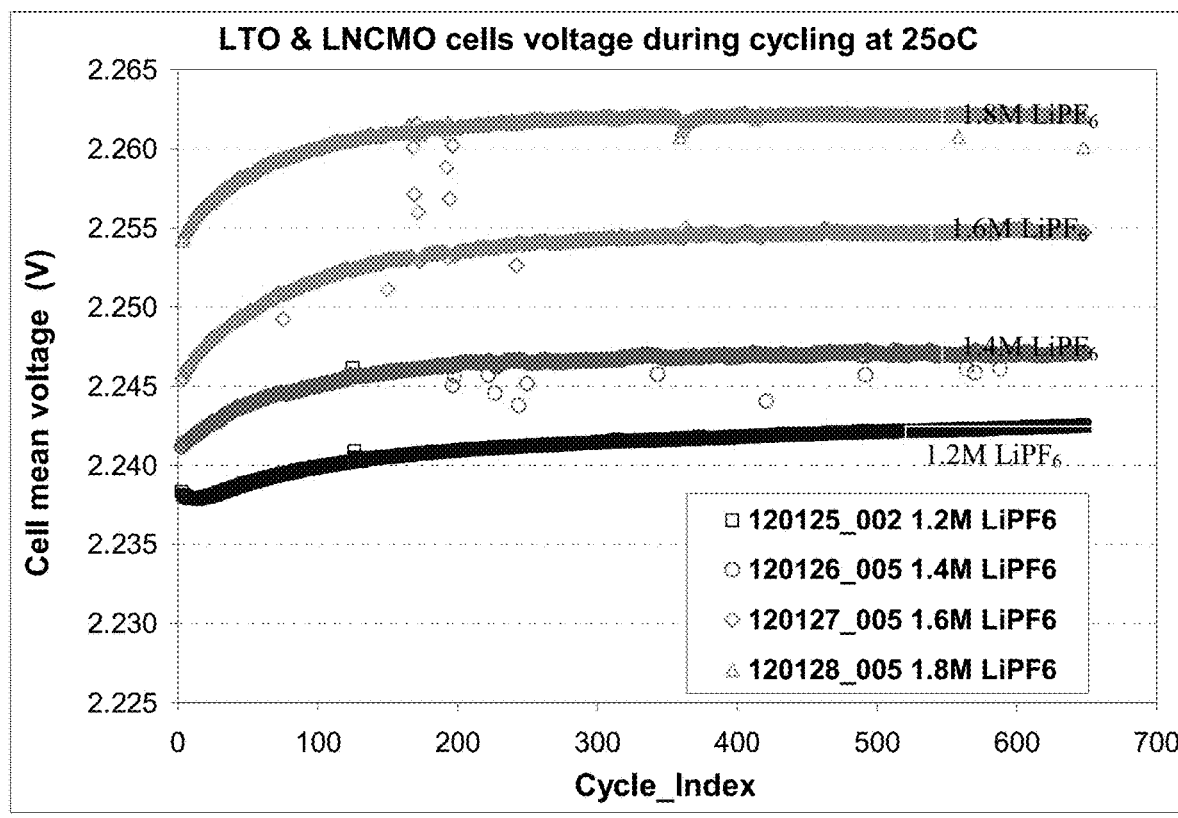
FIG. 4 is an illustration of the change in the mean cell voltage during 25° C. cycling test of $Li_4Ti_5O_{12}$/$LiNi_{0.33}Co_{0.33}Mn_{0.33}O_2$ cell activated with $LiPF_6$ in EC:EMC=1:4 electrolyte, where $LiPF_6$ salt concentration is respectively 1.2 M, 1.4 M, 1.6 M and 1.8 M.

Increasing the lithium salt (e.g. LiPF6 salt) concentration in the cell electrolyte increases the cell mean voltage with increase in LiPF6 salt concentration significantly beyond the concentration corresponding to the electrolyte maximum ion conductivity (FIG. 4). The increase may be 5% or greater, 10% or greater, 5% or greater, 15% or greater, 20% or greater, 25% or greater, 30% or greater, 35% or greater, 40% or greater, 45% or greater, 50% or greater, 55% or greater, 60% or greater, 75% or greater, 80% or greater, 85% or greater, 90% or greater, 95% or greater, 100% or greater or 200% or greater. The increase may be from 5% to 100%, 5% to 90%, 5% to 85%, 5% to 80%, 5% to 75%, 5% to 70%, 5% to 65%, 5% to 60%, 5% to 55%, 5% to 50%, 5% to 45%, 5% to 40%, 5% to 35%, 5% to 30%, 5% to 25%, 5% to 20%, 5% to 15%, 5% to 10%, 10% to 100%, 10% to 90%, 10% to 85%, 10% to 80%, 10% to 75%, 10% to 70%, 10% to 65%, 10% to 60%, 10% to 55%, 10% to 50%, 10% to 45%, 10% to 40%, 10% to 35%, 10% to 30%, 10% to 25%, 10% to 20%, 10% to 15%, 25% to 100%, 25% to 90%, 25% to 80%, 25% to 70%, 25% to 60%, 25% to 50%, 25% to 40%, 25% to 35%.

While not being bound to any particular theory about this unexpected effect there are several phenomena than may cause similar unexpected effect. The increase in salt concentration may improve the interface transport properties of the electrodes of Li4Ti5O12/LiNi0.33Co0.33Mn0.33O2 cell by forming thinner or higher lithium ion conductivity interface films which improves the lithium ion transport properties of the entire cell. An increase in salt concentration may increase the lithium ion transference number by the particular interaction of the lithium salt with electrolyte components and this may increase significantly the cell rate capability. Finally, during the formation of Li4Ti5O12/LiNi0.33Co0.33Mn0.33O2 cells a part of the salt may decompose to form the electrode interfaces which may shift the optimal salt concentration to a higher initial concentration of the salt in the electrolyte.

Increasing the concentration of the lithium salt in the electrolyte beyond the optimal salt concentration leads to an increase in cell capacity, increase in cell rate capability and causes improvement in capacity retention and increase in cell charge and discharge voltage. The combined effect of increased cell capacity, increased cell voltage and increased cell charge and discharge rate capability will increase the cell specific energy and the improved capacity retention will increase the cycle live versus reference cells.

Adding small amounts of certain chemicals, i.e., additives, to the electrolyte of a lithium ion secondary battery, may markedly improve certain properties such as battery cycle life and calendar life and the battery's cycling efficiency and reversible capacity. Certain additives may be dissolved in the electrolyte of a lithium ion secondary battery in order to suppress the decomposition of solvents resulting in the reduction of the generation of gas by the decomposition of the solvents. These additives tend to decrease cell capacity and cell capacity retention. Increasing the LiPF6 salt concentration beyond the maximum electrolyte conductivity offsets the negative effect in cycling performance of some additives generally used for suppressing cell gassing. As demonstrated in FIG. 5, the increase in LiPF6 salt concentration to 1.6 M or greater offsets the negative effect in capacity and cycling performance of the electrolyte which uses 1,3-propane sultone as a cell gassing suppressing additive. Examples of cell gassing suppressing additives including but are not limited to the organic sultones and the organic anhydrides. Examples of sultones include but are not limited to ethylene sultone, 1,3-propane sultone, 1,4-butane sultone, 1,5-pentane sultone, 1-methyl-1,3-propane sultone, and 1-fluoro-1,3-propane sultone and their analogous compounds. Organic anhydrides include but are not limited to succinic anhydride, 4-methylsuccinic acid anhydride, 4,4-dimethylsuccinic acid anhydride, 4,5-dimethylsuccinic acid anhydride, 4,4,5-trimethylsuccinic acid anhydride, citraconic acid anhydride, maleic acid anhydride and their analogous compounds.

In some variations of the cells of the present embodiment, the mean particle size of the pulverized particles that are created to form a negative electrode can range from 1 to 50 µm, 5 to 50 µm, 5 to 20 µm, or 10 to 20 µm, or 6 to 20 µm, 1 to 10 µm, 1 to 15 µm, 1 to 20 µm, or 10 to 20 µm, or 4 to 20 µm. In some variations, the mean particle size of the pulverized particles that are created to form a positive electrode can range from 1 to 10 µm, 1 to 15 µm, 1 to 20 µm, or 10 to 20 µm.

In some variations of the cells of the present embodiment, the specific surface area of the pulverized particles that are created to form a negative electrode can range from 5 m2/g to 120 m2/g or 15 m2/g to 100 m2/g or 20 m2/g to 80 m2/g or 30 m2/g to 70 m2/g or from 4 m2/g to 12 m2/g or from 2 m2/g to 20 m2/g or from 3 m2/g to 15 m2/g or from 4 m2/g to 10 m2/g or from 4 m2/g to 8 m2/g. In some variations, the specific surface area of the pulverized particles that are created to form a positive electrode can range from 1 m2/g to 20 m2/g, 2 m2/g to 8 m2/g or 3 m2/g to 7 m2/g.

In some variations of the cells of the present embodiment the Li4Ti5O12 electrode is composed by Li4Ti5O12 material having tap density in the range between 0.5 and 5.0 g/cc or 0.5 and 2.0 g/cc or 0.5 and 1.5 g/cc or 0.9 and 5.0 g/cc or 0.9 and 3.0 g/cc or 0.9 and 2.0 g/cc or 0.9 and 1.7 g/cc.

EXAMPLES

Example 1

Construction of the Cell

An electrochemical cell was assembled. The negative electrode was prepared from nano $Li_4Ti_5O_{12}$ and the positive electrode was prepared from $LiNi_{0.33}Co_{0.33}Mn_{0.33}O_2$ The negative electrode was prepared using the following steps: $Li_4Ti_5O_{12}$ was mixed with 5% carbon black and 5% PVDF binder dissolved in NMP solvent to form a slurry; the slurry was spread on aluminum foil and heated to evaporate the NMP solvent; the dry electrodes were calendared and cut into rectangular sample electrodes having a 2" by 3" size of about 38 cm². The positive electrode was prepared with $LiNi_{0.33}Co_{0.33}Mn_{0.33}O_2$ using the same procedure described for preparation of the negative electrode. Eight positive and eight negative electrodes were used to form the cell stack. The cell stack was placed inside in a soft pack electrochemical cell with $EC:EMC/LiPF_6$ electrolyte.

Example 2

Discharge Rate Capability

After preparation of batteries according to Example 1, the discharge rate capability of $Li_4Ti_5O_{12}$—$LiNi_{0.33}Co_{0.33}Mn_{0.33}O_2$ cell activated with $LiPF_6$ in EC:EMC=1:3 electrolyte was measured at 25° C. where the $LiPF_6$ concentrations in the electrolyte were 0.8 M, 1.0 M and 1.2 M. The discharge rate capability of $Li_4Ti_5O_{12}$—$LiNi_{0.33}Co_{0.33}Mn_{0.33}O_2$ cell activated with $LiPF_6$ in EC:EMC=1:4 electrolyte was also measured at 25° C. in which the $LiPF_6$ concentrations in the electrolyte were 1.2 M, 1.4 M, 1.6 M and 1.8 M. The discharge rate capability was measured by measuring the cell capacity at different discharge rates in the range between 1 C rate and 10 C discharge rate after charging the cell at the 1 C rate. The discharge rate for this measurement was defined as the ratio between discharge current in amperes and cell capacity at 1 C charge/discharge rate in amperhours.

As illustrated in FIG. 1, the discharge rate capability of the cell with 1.2 M $LiPF_6$ concentration is much better than the discharge rate capability of cell with 1.0 M $LiPF_6$ lithium salt concentration. As shown in FIG. 2 the discharge rate capability significantly increases with increasing salt concentration. This includes concentrations significantly greater than the concentrations of lithium salt typically used in lithium ion cells and significantly greater than the maximum ion conductivity of electrolyte, which is below 1.2 M $LiPF_6$.

Example 3

Cycling Test

After preparation of batteries according to Example 1, cell capacity and cycling performance of $Li_4Ti_5O_{12}$—$LiNi_{0.33}Co_{0.33}Mn_{0.33}O_2$ cells activated with $LiPF_6$ in EC:EMC=1:4 electrolyte, where $LiPF_6$ electrolytes having concentrations of 1.2 M, 1.4 M, 1.6 M and 1.8 M were measured. The cycling test was performed at 25° C. using 100% DOD (Depth of Discharge) 2 C constant current charge rate and 2 C constant current discharge rate cycling test As displayed in FIG. 3 with an increase in the electrolyte salt concentration beyond 1.2 M $LiPF_6$ (which is higher than max electrolyte conductivity) there is significant increase in cell capacity and improvement in capacity retention.

Example 4

Mean Cell Voltage

After preparation of batteries according to Example 1, mean cell voltage of $Li_4Ti_5O_{12}$—$LiNi_{0.33}Co_{0.33}Mn_{0.33}O_2$ cells activated with $LiPF_6$ in EC:EMC=1:4 electrolyte, where $LiPF_6$ electrolytes have concentrations of 1.2 M, 1.4 M, 1.6 M and 1.8 M was measured during at 25° C., 100% DOD at 2 C constant current charge rate and 2 C constant current discharge rate cycling test. The results of the test are displayed in FIG. 4 which shows that there is an increase in cell mean voltage with increasing LiPF6 salt concentration in the electrolyte salt concentration range higher than the one corresponding to the maximum electrolyte conductivity.

Example 5

Additives

Figure 5:
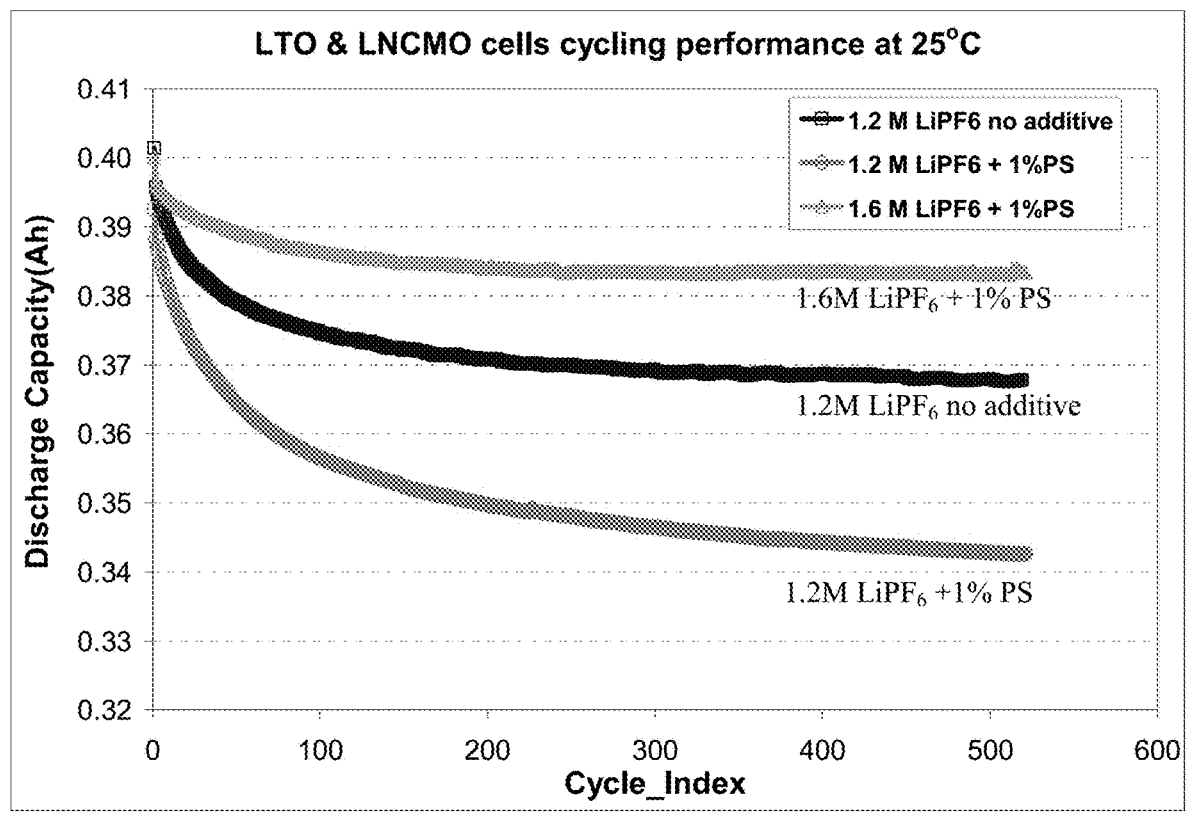
FIG. 5 is an illustration of the capacity and capacity retention during 25° C. cycling test of $Li_4Ti_5O_{12}$/$LiNi_{0.33}Co_{0.33}Mn_{0.33}O_2$ cells activated with 1.2 M $LiPF_6$ in EC:EMC=1:4 electrolyte, with and without 1% 1,3-propanesultone to the electrolyte as cell gassing suppressant additive and cell with 1.6 M LiPF6 in EC:EMC=1:4 electrolyte with 1% 1,3-propanesultone to the electrolyte as cell gassing suppressant additive.

Batteries were made according to Example 1 with $LiPF_6$ in EC:EMC=1:4 electrolyte, where the $LiPF_6$ electrolyte has a concentration 1.2 M and with the addition or without the addition of 1% 1,3-propanesultone to the electrolyte as cell gassing suppressant additive. A cycling test at 25° C. and 2 C charge and 2 C discharge rate was performed according to Example 3 and the results are shown in FIG. 5. As demonstrated in FIG. 5 the use of 1,3-propanesultone as cell gassing suppressant additive results in a significant trade off with cell cycling performance. Another battery was made according to Example 1 with $LiPF_6$ in EC:EMC=1:4 electrolyte, where $LiPF_6$ electrolyte has a concentration of 1.6 M and with addition of 1% 1,3-propanesultone to the electrolyte as cell gassing suppressant additive. A cycling test at 25° C. and 2 C charge and 2 C discharge rate was performed according to Example 3 and the result is also shown in FIG. 5. As shown in FIG. 5, the use of 1.6 M $LiPF_6$ completely compensates for the negative effect of the 1,3-propanesultone on the cell cycling performance of $Li_4Ti_5O_{12}$—$LiNi_{0.33}Co_{0.33}Mn_{0.33}O_2$ cells activated with $LiPF_6$ in EC:EMC=1:4 electrolyte in which the concentration of $LiPF_6$ in the electrolyte was 1.2 M or 1.6 M. The increase in the salt concentration from 1.2 M to 1.6 M completely offset the negative effect on the cell capacity and on the cell cycling performance caused by the use of 1,3-propanesultone as electrolyte additive in electrochemical cell with $Li_4Ti_5O_{12}$ and $LiNi_{0.33}Co_{0.33}Mn_{0.33}O_2$ as negative and positive electrode materials.

Within this disclosure, any indication that a feature is optional is intended provide adequate support (e.g., under 35 U.S.C. 112 or Art. 83 and 84 of EPC) for claims that include closed or exclusive or negative language with reference to the optional feature. Exclusive language specifically excludes the particular recited feature from including any additional subject matter. For example, if it is indicated that A can be drug X, such language is intended to provide support for a claim that explicitly specifies that A consists of X alone, or that A does not include any other drugs besides X. "Negative" language explicitly excludes the optional feature itself from the scope of the claims. For example, if it is indicated that element A can include X, such language is intended to provide support for a claim that explicitly specifies that A does not include X. Non-limiting examples of exclusive or negative terms include "only," "solely," "consisting of," "consisting essentially of," "alone," "without", "in the absence of (e.g., other items of the same type, structure and/or function)" "excluding," "not including", "not", "cannot," or any combination and/or variation of such language.

Similarly, referents such as "a," "an," "said," or "the," are intended to support both single and/or plural occurrences unless the context indicates otherwise. For example "a dog" is intended to include support for one dog, no more than one dog, at least one dog, a plurality of dogs, etc. Non-limiting examples of qualifying terms that indicate singularity include "a single", "one," "alone," "only one," "not more than one", etc. Non-limiting examples of qualifying terms that indicate (potential or actual) plurality include "at least one," "one or more," "more than one," "two or more," "a multiplicity," "a plurality," "any combination of," "any permutation of," "any one or more of," etc. Claims or descriptions that include "or" between one or more members of a group are considered satisfied if one, more than one, or all of the group members are present in, employed in, or otherwise relevant to a given product or process unless indicated to the contrary or otherwise evident from the context.

All publications and patents cited in this specification are herein incorporated by reference as if each individual publication or patent were specifically and individually indicated to be incorporated by reference. The citation of any publication is for its disclosure prior to the filing date and should not be construed as an admission that the present embodiment is not entitled to antedate such publication by virtue of prior embodiment.

While this embodiment has been particularly shown and described with references to example embodiments thereof, it will be understood by those skilled in the art that the various changes in form and details may be made therein without departing from the scope of the embodiment encompassed by the appended claims.

What is claimed is:

1. An electrolyte for a lithium ion battery with a $Li_4Ti_5O_{12}$ compound as a negative electrode and a $LiNi_{0.33}Co_{0.33}Mn_{0.33}O_2$ compound as a positive electrode comprising a solvent consisting of ethylene carbonate and ethylmethyl carbonate and a lithium salt consisting of $LiPF_6$ wherein the $LiPF_6$ concentration exceeds the $LiPF_6$ concentration corresponding to maximum electrolyte ionic conductivity and an electrolyte additive to suppress the decomposition of the solvent wherein the additive is selected from the group consisting of 1,3-propane sultone or succinic anhydride or a combination of 1,3-propane sultone and succinic anhydride.

2. The electrolyte of claim 1 wherein the concentration of $LiPF_6$ is from about 1.2M to about 2.0M.

3. The electrolyte of claim 1 wherein the concentration of $LiPF_6$ is equal or higher than 1.4M.

4. A lithium ion cell comprising at least $Li_4Ti_5O_{12}$ compound as a negative electrode and a $LiNi_{0.33}Co_{0.33}Mn_{0.33}O_2$ compound as positive electrode, a separator and a non-aqueous electrolyte comprising a lithium salt consisting of a $LiPF_6$ salt dissolved in a solvent consisting of a mixture of ethylene carbonate and ethyl methyl carbonate and electrolyte additives to suppress the decomposition of the solvent wherein the concentration of the said $LiPF_6$ salt exceeds the $LiPF_6$ concentration corresponding to maximum electrolyte ionic conductivity and an additive and wherein the additive is selected from the group consisting of 1,3-propane sultone or succinic anhydride or a combination of 1,3-propane sultone and succinic anhydride.

5. The lithium ion cell according to claim 4 wherein the concentration of the said $LiPF_6$ salt is equal or higher than 1.6 M.

6. The lithium ion cell according to claim 4 wherein the said $Li_4Ti_5O_{12}$ electrode is composed by $Li_4Ti_5O_{12}$ material having BET in the range of 4 $m^2$/g to 12 $m^2$/g.

7. The lithium ion cell according to claim 4 wherein the said $Li_4Ti_5O_{12}$ electrode is composed by $Li_4Ti_5O_{12}$ material having mean particle size between 4 and 20 microns.

8. The lithium ion cell according to claim 4 wherein the said $Li_4Ti_5O_{12}$ electrode is composed by $Li_4Ti_5O_{12}$ material having tap density in the range between 0.9 and 1.7 g/cc.

9. The lithium ion cell according to claim 4 wherein the said $Li_4Ti_5O_{12}$ electrode is composed by $Li_4Ti_5O_{12}$ material having tap density in the range between 0.9 and 1.5 g/cc.

10. The lithium ion cell according to claim 4 wherein the cell mean voltage is increased as compared to the concentration corresponding to the $LiPF_6$ electrolyte maximum ion conductivity.

11. The lithium ion cell according to claim 4 wherein the cell mean voltage is increased as compared to the concentration corresponding to the $LiPF_6$ electrolyte maximum ion conductivity by 5% to 20%.

12. The electrolyte of claim 1 wherein the ratio of ethylene carbonate to ethylmethyl carbonate is 1:3.

13. The electrolyte of claim 1 wherein the ratio of ethylene carbonate to ethylmethyl carbonate is 1:4.

14. An electrolyte for a lithium ion battery with a $Li_4Ti_5O_{12}$ compound as a negative electrode and a $LiNi_{0.33}Co_{0.33}Mn_{0.33}O_2$ compound as a positive electrode consisting essentially of ethylene carbonate, ethylmethyl carbonate, $LiPF_6$ salt in a concentration which exceeds the $LiPF_6$ concentration corresponding to maximum electrolyte ionic conductivity, 1,3-propane sultone and succinic anhydride.

* * * * *